US010877058B2

(12) United States Patent
Forrer

(10) Patent No.: US 10,877,058 B2
(45) Date of Patent: Dec. 29, 2020

(54) VIAL-HANDLING MECHANISM FOR AN AUTOMATED KARL FISCHER TITRATION SYSTEM

(71) Applicant: Mettler-Toledo GmbH, Greifensee (CH)

(72) Inventor: Christian Forrer, Elsau (CH)

(73) Assignee: Mettler-Toledo GmbH, Greifensee (CH)

( * ) Notice: Subject to any disclaimer, the term of this patent is extended or adjusted under 35 U.S.C. 154(b) by 392 days.

(21) Appl. No.: 16/059,899

(22) Filed: Aug. 9, 2018

(65) Prior Publication Data

US 2019/0049478 A1 Feb. 14, 2019

(30) Foreign Application Priority Data

Aug. 10, 2017 (EP) ..................................... 17185694

(51) Int. Cl.
*G01N 35/10* (2006.01)
*G01N 35/02* (2006.01)
(Continued)

(52) U.S. Cl.
CPC ....... *G01N 35/1083* (2013.01); *G01N 35/025* (2013.01); *G01N 35/04* (2013.01);
(Continued)

(58) Field of Classification Search
CPC .. G01N 35/1083; G01N 35/04; G01N 35/025; G01N 35/1011; G01N 35/1079; G01N 31/16; G01N 35/10; G01N 1/22; G01N 31/168; G01N 2035/1088; G01N 2035/0441; G01N 31/162; G01T 1/20; B01L 3/00
See application file for complete search history.

(56) References Cited

U.S. PATENT DOCUMENTS 3,809,897 A 5/1974 Thomas et al.
8,806,965 B2 8/2014 Sato et al.

FOREIGN PATENT DOCUMENTS

DE 101 24 308 A1 11/2002

OTHER PUBLICATIONS

Metrohm AG, 874 Oven Sample Processor Manual, retrieved Jan. 15, 2018 at https://www.rnetrohm.com/en-us/products-overview/karl-fischer-titration/kf-sample-preparation/%7B17C1BE6F-C233-4185-A861-A7F283081306%7D, Jun. 2011, 79 pages, Switzerland.

*Primary Examiner* — Benjamin R Whatley
*Assistant Examiner* — Curtis A Thompson
(74) *Attorney, Agent, or Firm* — Standley Law Group LLP; Jeffrey S. Standley; Stephen L. Grant

(57) ABSTRACT

A mechanism (10) for an automated Karl Fischer ("KF") titration system (1) includes a support console (6), a first vertical guide rail element (11), solidly attached to the support console, and a carriage unit (12), slidably constrained to the first vertical guide rail element, allowing the carriage unit a first degree of linear vertical mobility relative to the support console. The carriage unit holds a vial lift unit (13) with a lift platform (14) for a sample vial (18). The carriage unit, in a downward movement phase, lowers the lift platform from a starting position into an oven cavity of the titration system. A subsequent upward movement phase raises the lift platform to the starting position. A second vertical guide rail element, solidly connected to the lift platform and slidably constrained to the carriage unit, enables a second degree of linear vertical mobility of the lift platform.

16 Claims, 6 Drawing Sheets

(51) Int. Cl.
  *G01N 35/04* (2006.01)
  *G01N 31/16* (2006.01)
  *G01N 1/22* (2006.01)
  *B01L 3/00* (2006.01)
  *G01T 1/20* (2006.01)
(52) U.S. Cl.
  CPC ..... *G01N 35/1011* (2013.01); *G01N 35/1079* (2013.01); *B01L 3/00* (2013.01); *G01N 1/22* (2013.01); *G01N 31/16* (2013.01); *G01N 31/168* (2013.01); *G01N 35/10* (2013.01); *G01N 2035/0441* (2013.01); *G01N 2035/1088* (2013.01); *G01T 1/20* (2013.01)

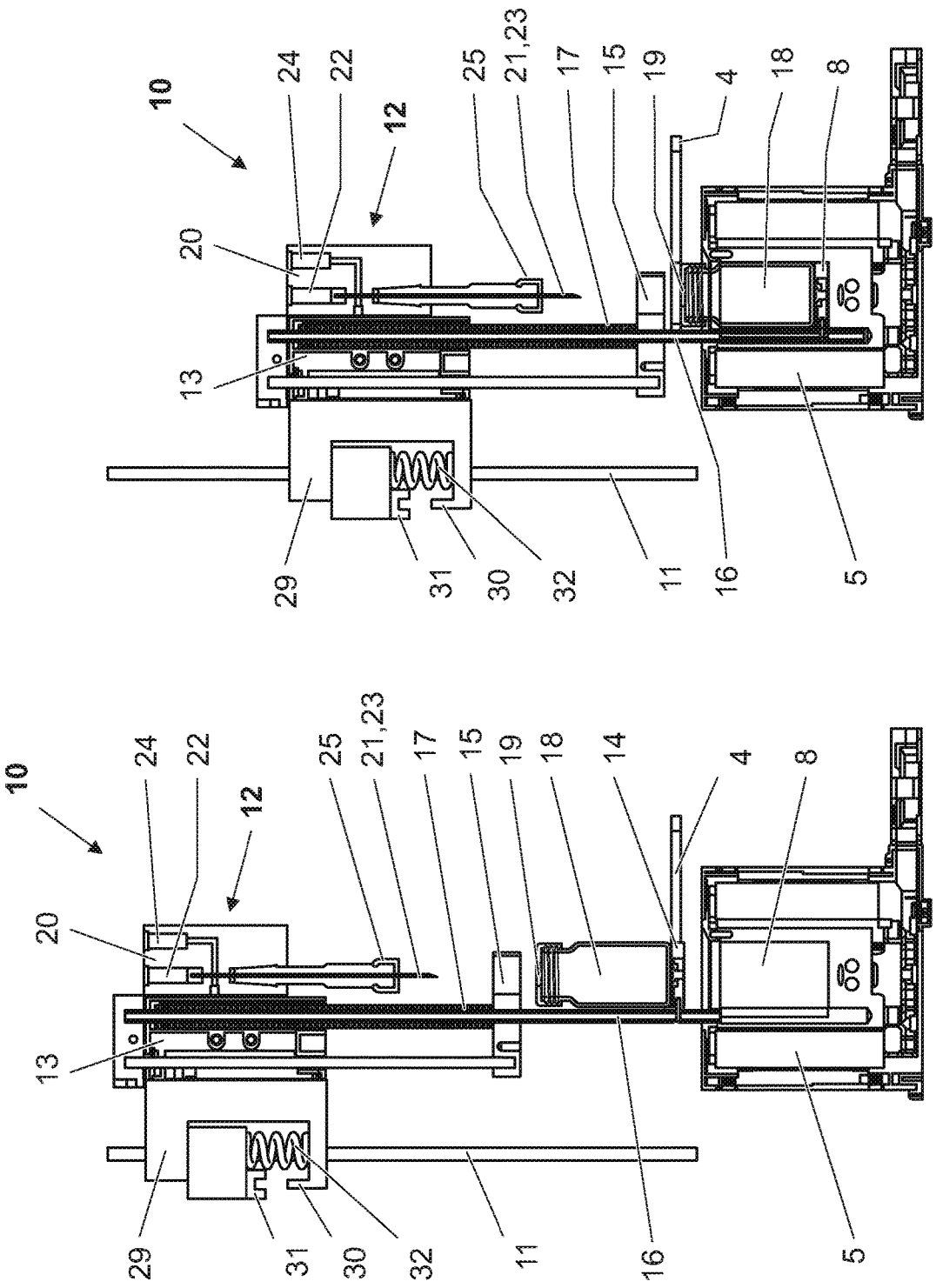

VIAL-HANDLING MECHANISM FOR AN AUTOMATED KARL FISCHER TITRATION SYSTEM

CROSS-REFERENCE TO RELATED APPLICATIONS

This application claims priority to European Patent Application No. 17185694.1, filed on 10 Aug. 2017, which is incorporated by reference as if fully recited herein.

TECHNICAL FIELD

The invention relates to a vial-handling mechanism for an automated Karl Fischer titration system (hereinafter referred to as KF titration system), in particular for a system designed to perform KF titrations according to the gas phase extraction method which will be explained below.

BACKGROUND ART

Karl Fischer titration (KF titration) is a well-known process for an accurate and precise determination of the moisture or water content in a sample. The two methods for KF titration are mainly used are coulometric and volumetric titration. Both methods face the same issue that some substances release their moisture or water content only slowly or at elevated temperatures. Consequently, the KF titration process requires the evaporation of these samples through heating to determine their moisture or water content.

The sample is heated and thereby evaporated. The evaporated sample is transferred continuously to a titration cell by means of a dry carrier gas. In the titration cell, the evaporated sample is neutralised progressively and from the quantity of reagent necessary to neutralise the evaporated sample the moisture or water content of the sample can be determined. This procedure, in which the sample is heated and the evaporated sample is transferred to a titration cell by means of a dry carrier gas, is referred to as the gas phase extraction method or oven method.

An automated Karl Fischer titration system can be provided to enable the processing of several samples consecutively. Said automated Karl Fischer titration system further comprises a sample changer, an oven and a transfer system to transfer each sample or a respective vial containing said sample from the sample changer into the oven for heating up the sample.

Laboratory sample changers belong to the known state of the art. Typical configurations are the carousel changer with a revolving circular sample tray or the linear changer with a drawer-style sample rack that moves in a straight line. Of course, instead of a sample tray or rack, an automated system could also be equipped with a single-sample loading station where the function of loading and removing the samples would be performed by a human operator.

The object of the present invention is to provide a vial-handling mechanism which advantageously cooperates with the oven of said co-pending patent application and with a state-of-the-art sample changer (for example a carousel changer) in performing at least the three functions of transferring each sample from the sample changer to an oven, connecting the inflow and outflow conduits to the sample, and finally disconnecting said conduits from the sample vial and returning the vial to the sample changer.

SUMMARY

This task is solved by a vial-handling mechanism as set forth in the independent claim. Details and variants of the invention are described in the dependent claims.

According to the present invention, a vial-handling mechanism which cooperates with an oven and a sample changer in an automated Karl Fischer titration system includes a tower-shaped support console, a first vertical guide rail element which is solidly attached to the support console, and a carriage unit which is slidably constrained to the first vertical guide rail element, allowing a first degree of linear vertical mobility of the carriage unit relative to the support console. The carriage unit includes a vial lift unit with a lift platform onto which a current sample vial to be analyzed is slid through a horizontal movement of the sample changer. The carriage unit is operable in a downward movement phase to lower the vial lift unit with the lift platform from a starting position into the oven cavity of the Karl Fischer oven, and in a subsequent upward movement phase to raise the vial lift unit with the lift platform back to the sample changer, whereupon the sample changer pushes the current sample vial off the lift platform and slides a next sample vial onto the lift platform. According to the invention, the vial lift unit includes a second vertical guide rail element which is solidly connected to the lift platform and slidably constrained to the carriage unit whereby a second degree of linear vertical mobility of the lift platform relative to the carriage unit is enabled. Further according to the invention, the vial lift unit also includes a compression spring element operable to oppose a relative upward movement of the vial lift unit against the carriage unit.

Consequently, in the downward movement phase of the carriage unit, after the lift platform has come to rest on the oven floor, continued downward movement of the carriage unit gives rise to an increasing opposing force of the compression spring. With the subsequent upward movement of the carriage unit, the vial lift unit returns to its end position in the second vertical movement range and the compression spring expands back to its original length, at which point the lift platform starts to separate itself from the oven floor.

The carriage unit preferably includes a syringe unit with at least two syringes, i.e., an inlet syringe connected to a delivery conduit for delivering dry carrier gas to the sample vial, and an outflow conduit for removing vaporized sample and carrier gas from the sample vial. The syringe unit is solidly connected to the carriage unit and arranged so that a continued downward movement of the carriage unit after the lift platform has come to rest on the oven floor causes the syringes to puncture the lid of the sample vial and thereby to connect the sample vial to the delivery conduit and the outflow conduit.

In a preferred embodiment, the syringes are arranged concentrically, with the outlet syringe surrounding the inlet syringe. Advantageously, the syringe unit includes a sealing element which surrounds the syringe unit like a collar and forms a tight seal around the entry puncture of the syringes after the carriage unit has completed its continued downward movement.

According to a preferred embodiment, a vial separator element is solidly connected to the vial lift unit and arranged to pull the sample vial off the syringe unit after the lift platform has started to separate itself from the oven floor and thereby to allow the sample vial to drop back onto the lift platform.

In a preferred embodiment, the vial handling mechanism includes a drive unit for actuating the vertical up and down movements of the carriage in response to command signals received from a controller of the automated KF titration system.

Such a drive unit can be realized advantageously with a stepper motor and a spindle drive mechanism. Thus, the carriage unit can me moved up or down by predetermined amounts through pulse signals from the controller of the automated KF titration system.

In an advantageous embodiment of the invention, the carriage unit has a two-part configuration, wherein the first part is a slider block whose sliding movement along the first vertical guide rail is actuated by the drive unit, the second part is a carriage stage which holds the vial lift unit and the syringe unit and is slidable along the first vertical guide rail within a narrow range of vertical movement relative to the slider block, and wherein a light gate with a light barrier vane and an emitter/sensor unit is arranged between the slider block and the carriage stage and a biasing spring urges the slider block and the carriage stage apart to hold the light gate open, and wherein further, when the carriage stage arrives at an end of its downward travel range and the slider block continues to be driven against the carriage stage by the drive unit against the force of the biasing spring, the light gate is closed, causing a signal to the sent to the controller indicating the completion of the downward movement of the carriage unit.

BRIEF DESCRIPTION OF THE DRAWINGS

The vial-handling mechanism according to the invention will be described in the following through a series of drawings showing the mechanism at the different stages of its operating cycle, wherein:

FIGS. 3 to 6 illustrate the vial-handling mechanism in four stages of the downward movement of the carriage unit.

DETAILED DESCRIPTION OF THE EMBODIMENTS

Figure 1:
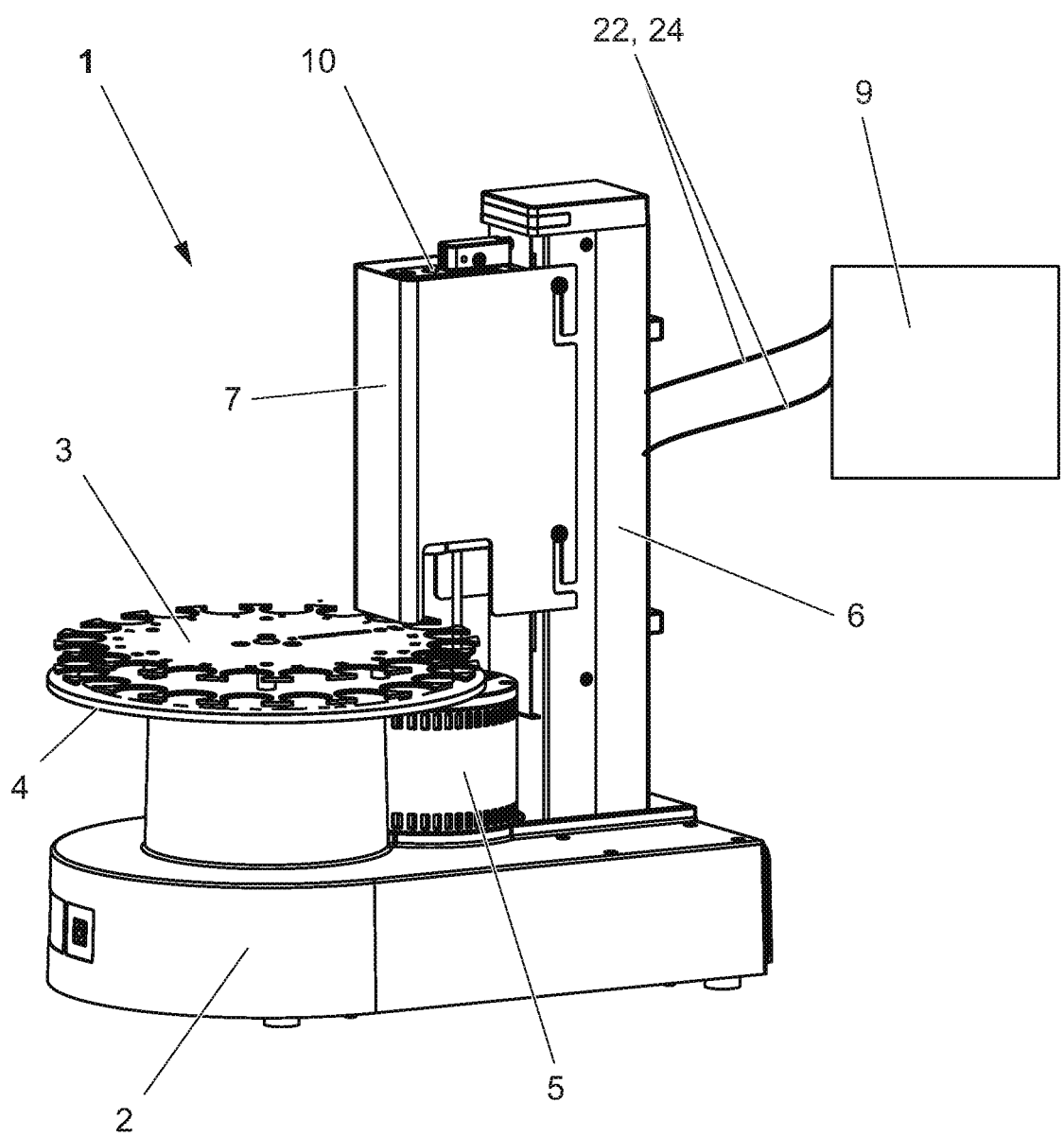
FIG. 1 represents a three-dimensional view of an automated KF titration system in which the vial-handling mechanism according to the invention is incorporated.

FIG. 1 represents an automated KF titration system 1 in which a vial-handling mechanism 10 according to the invention is incorporated. Arranged on a chassis base 2 are a carousel-type sample changer 3 with a sample changer platform 4, a KF titration oven 5, and a tower-shaped support console 6 supporting the vial-handling mechanism 10 inside a protective enclosure 7. A sample introduced into the oven is heated there, and the evaporated sample is then transferred by a carrier gas to a suitable analyzing system 9, such as a KF titration system. The carrier gas is introduced into the oven through a first conduit 22. The carrier gas and the evaporated sample are transferred from the oven to the analyzing system through a second conduit 24.

Figure 2:
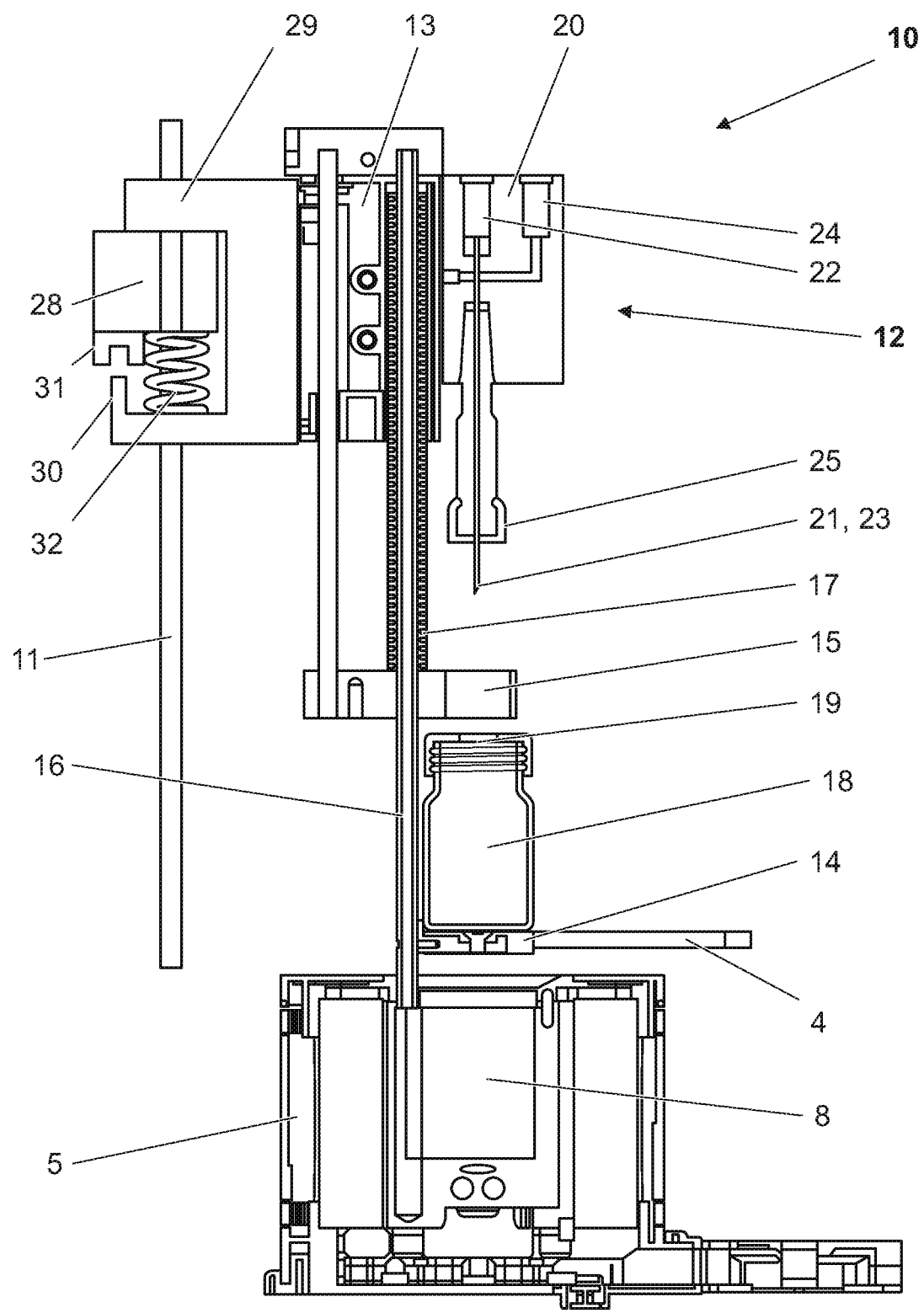
FIG. 2 schematically illustrates the vial-handling mechanism according to the invention and identifies its essential elements.

The constituent elements of the vial-handling mechanism 10 are shown in FIG. 2 and their respective functions will become evident from FIGS. 3 through 10. A first vertical guide rail element 11 is solidly attached to the tower-shaped support console 6 of FIG. 1, and a carriage unit 12 is slidably constrained to the first vertical guide rail element 11, allowing a first linear vertical movement of the carriage unit along the first vertical guide rail element 11.

The carriage unit 12 includes a vial lift unit 13 with a lift platform 14 and a vial separator element 15. The lift platform 14 and the vial separator element 15 are solidly connected to a second vertical guide rail element 16, which is slidably constrained to the carriage unit 12, allowing a second vertical movement of the lift platform 14 and separator element 15 relative to the carriage unit 12. The vial lift unit 13 also includes a spring element 17 arranged to elastically oppose said relative vertical movement.

In FIG. 2, a section of the sample changer platform 4 is symbolically indicated next to the lift platform 14. A sample vial 18 with a lid 19 is shown on the lift platform 14. The sample changer 3 of FIG. 1 performs the function of sliding the sample vials 18 from the sample changer platform 4 onto the lift platform 14 and back to the sample changer platform 4. Arranged below the lift platform 14 is the KF oven 5, whose oven cavity 8 is aligned to receive the lift platform 14 with the sample vial 18.

The carriage unit 12 further holds a syringe unit 20 with an inlet syringe 21 connected to a delivery conduit 22 for a dry carrier gas and an outlet syringe 23 connected to an outflow conduit 24 for the combined carrier gas and evaporated water. The syringes 21 and 23 in the illustrated embodiment are arranged concentrically with the outlet syringe 23 surrounding the inlet syringe 21. The syringe unit 20 includes a sealing element 25 which surrounds the lower end of the syringe unit 20 like a collar.

The carriage unit 12 in the embodiment of FIG. 2 has a two-part configuration wherein the first part is a slider block 28 whose sliding movement along the first vertical guide rail is actuated by a drive unit, for example a stepper motor with a spindle (not shown in the drawing). The second part is the carriage stage 29, slidable along the first vertical guide rail 11 within a narrow range of vertical movement relative to the slider block 28. The carriage stage 29 holds the vertically movable vial lift unit 13 and the syringe unit 20. A light gate with a light barrier vane 30 and an emitter/sensor unit 31 is arranged between the slider block 28 and the carriage stage 29. A biasing spring 32 urges the slider block 28 and the carriage stage 29 apart to hold the light gate 30, 31 open. When the carriage stage 29 arrives at an end of its downward travel range, the slider block 28 continues to be driven against the carriage stage 29 by the drive unit against the force of the biasing spring 32 until the light gate 30, 31 is closed, causing a signal to the sent to the controller indicating the completion of the downward movement of the carriage unit 12.

FIGS. 3 to 6 illustrate the vial-handling mechanism 10 in four stages of the downward movement of the carriage unit 12. By comparing the successive positions of the slider block 28 in the juxtaposition of FIGS. 3 to 6, the downward movement of the carriage unit 12 can be immediately visualized.

FIG. 3 shows the vial-handling mechanism 10 in its starting position. A sample vial 18 has been pushed by the sample changer 3 from the sample changer platform 4 onto the vial lift platform 14.

In FIG. 4, the carriage unit 12 has moved downward to the point where the vial lift platform 14 comes to rest on the floor of the KF oven 5.

Figure 5:
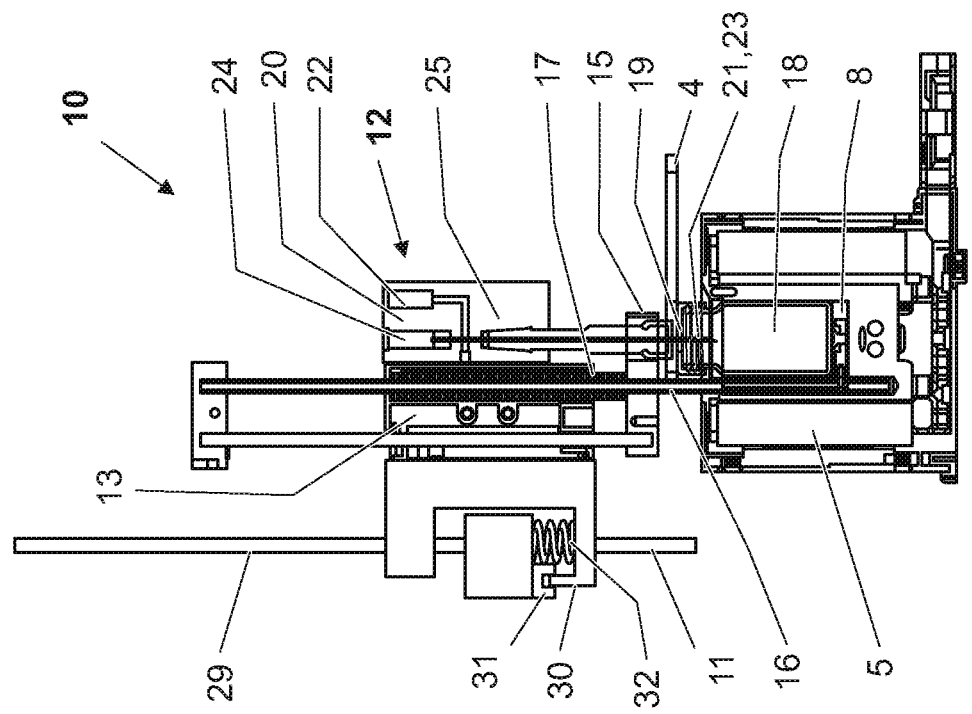

In FIG. 5, the carriage unit 12 has continued its downward movement, whereby the spring element 17 has been compressed and the syringe unit 20 has been lowered to the point where the syringes 21, 23 have punctured the vial lid 19 and entered into the sample vial 18, and the sealing element 25 is in tight contact with the vial lid 19. The second vertical guide rail element 16 has reached the end of its movement range relative to the carriage unit 12.

Figure 6:
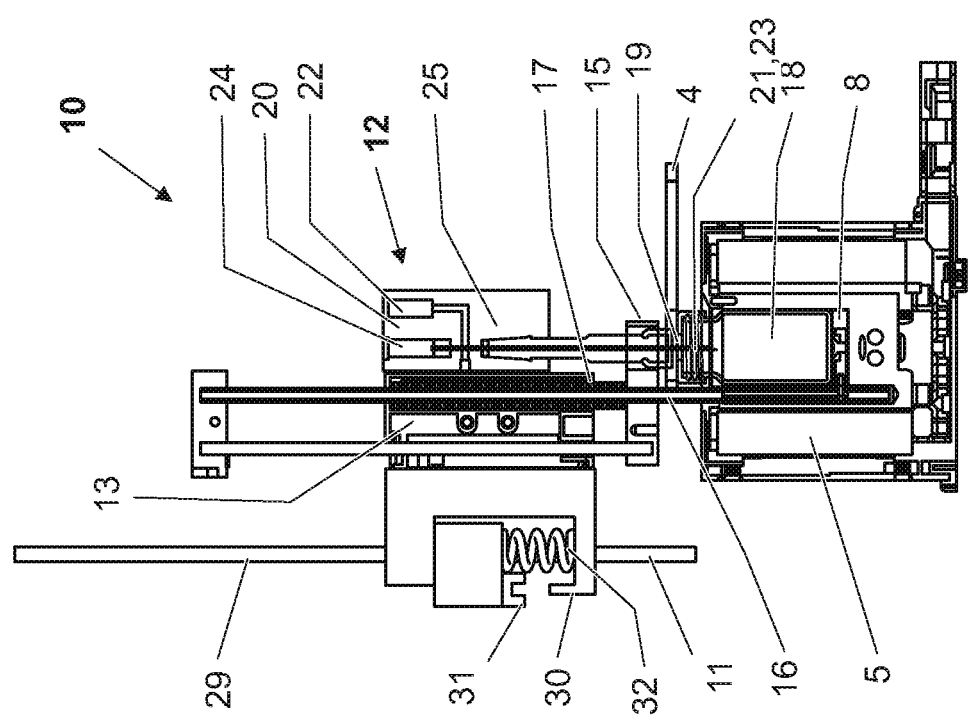

In FIG. 6, the slider block 28 of the carriage unit 12 has continued its downward movement by an additional amount, whereby the biasing spring 32 has been compressed and the light gate (30, 31) has been closed, causing a signal to be sent to the controller indicating the completion of the downward movement of the carriage unit 12. This signal also serves to confirm the presence of a vial 18. In the absence of a vial 18, the carriage unit 12 would continue to move downward until the controller stops the drive unit based on a plausibility criterion. After the controller has received the signal from the light gate 30, 31, the KF titration of the sample is started.

FIGS. 7 to 10 illustrate the vial-handling mechanism 10 in four stages of the upward movement of the carriage unit 12. By comparing the successive positions of the slider block 28 in the juxtaposition of FIGS. 7 to 10, the upward movement of the carriage unit 12 can be immediately visualized.

Figure 7:
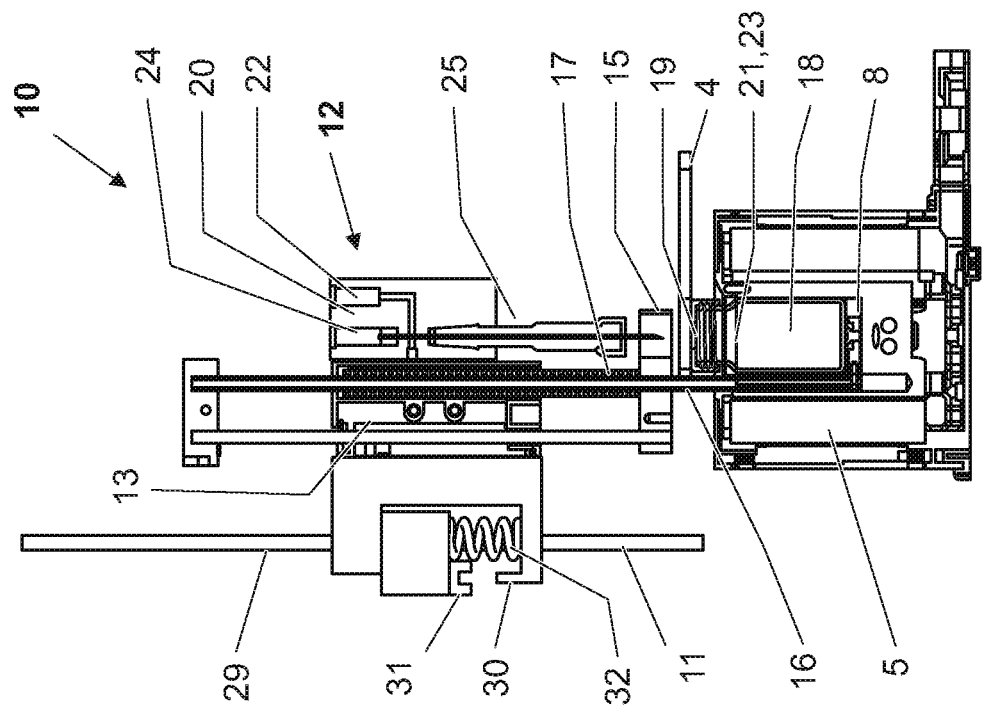
FIGS. 7 to 10 illustrate the vial-handling mechanism in four stages of the upward movement of the carriage unit.

In FIG. 7, the slider block 28 has moved upward to the point where the light gate 30, 31 is open again and the inserted syringes 21, 23 have pulled the vial 18 upward against the vial separator element 15. The opening of the light gate 30, 31 can be detected by the controller to confirm that the upward movement has started.

Figure 8:
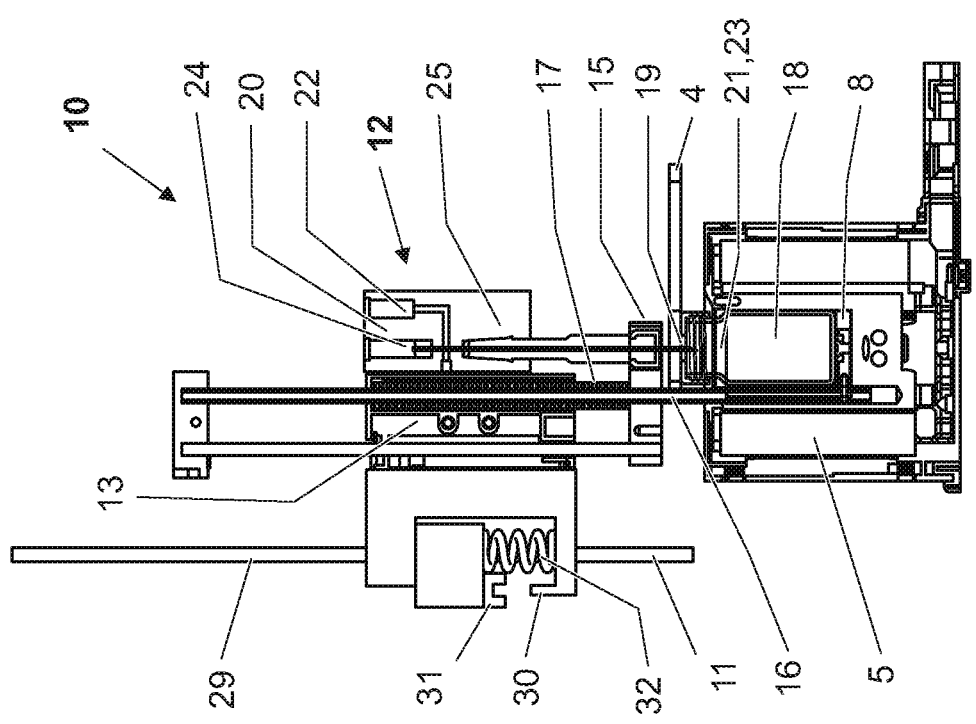

In FIG. 8, the carriage unit 12 has continued its upward movement to the point where the separator element 15 has extracted the syringes 21, 23 from the vial lid 19 and the vial 18 has dropped backed down onto the lift platform 14. The dropping height is minimal, and the fact that the separation of the vial 18 from the syringes 21, 23 occurs while the vial 18 is still in the oven cavity prevents the vial 18 from being dislodged out of its accurate seating position on the lift platform 14.

Figure 9:
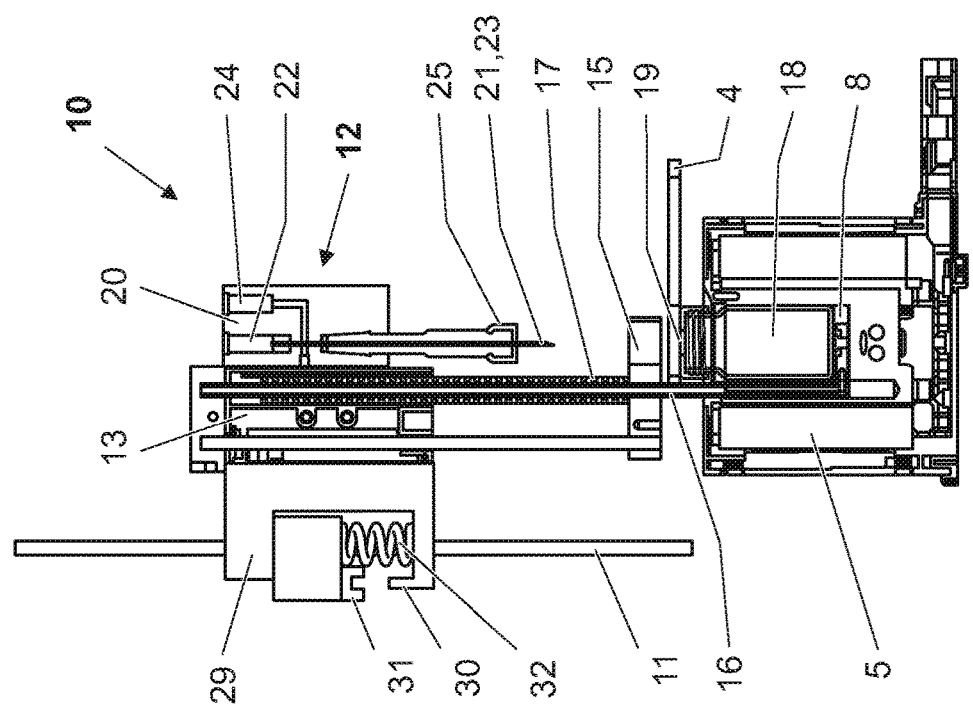

In FIG. 9, the carriage unit 12 has further continued its upward movement to the point where the second vertical guide rail element 16 has reached the end of its movement range relative to the carriage unit 12 and the spring element 17 has been decompressed. The lift platform 14 is at this point still resting on the floor of the KF oven cavity 8.

Figure 10:
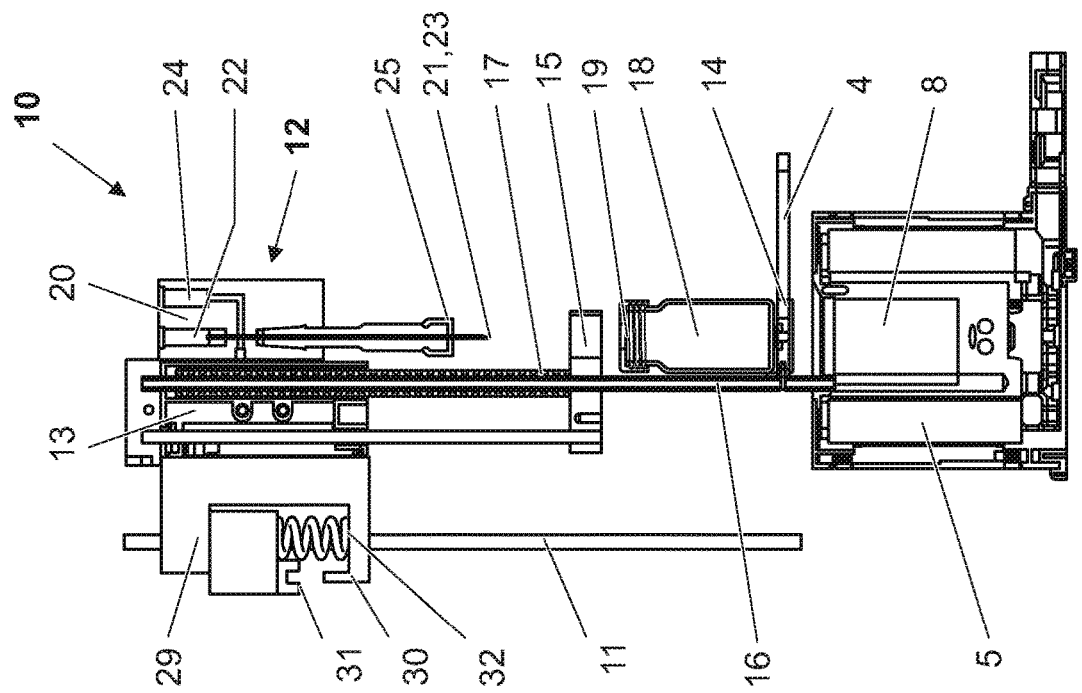

In FIG. 10, the carriage unit 12 has returned to the start position, where the lift platform 14 is flush with the sample changer platform.

While the invention has been described through the presentation of a specific embodiment, it is considered self-evident that numerous additional variants are encompassed by the teachings of the present invention. For example, the linear vertical movements of the carriage unit relative to the tower-shaped console and of the lift platform relative to the carriage unit could be guided by guide track arrangements different from the illustrated first and second guide rail elements. Such variations of the concepts described and claimed herein fall clearly within the scope of protection that is hereby sought for the present invention.

What is claimed is:

1. A mechanism for handling sample vials for an automated Karl Fischer ("KF") titration system having an oven with an oven cavity, the mechanism comprising:
    a tower-shaped support console; a first vertical guide rail element which is solidly attached to the support console; and
    a carriage unit, slidably constrained to a first degree of linear vertical mobility by the first vertical guide rail element relative to the support console, comprising a vial lift unit with a lift platform adapted to receive a sample vial, such that, in a downward movement phase, the carriage unit lowers the lift platform from a starting position into the oven cavity, and, in a subsequent upward movement phase, the carriage unit raises the lift platform back to the starting position;
    wherein the vial lift unit comprises:
    a second vertical guide rail element which is solidly connected to the lift platform and slidably constrained to the carriage unit, enabling a second degree of linear vertical mobility of the lift platform relative to the carriage unit; and
    a compression spring element, arranged to oppose a relative upward movement of the lift platform against the carriage unit.

2. The mechanism of claim 1, wherein the carriage unit further comprises:
    a syringe unit with at least an inlet syringe, connected to a delivery conduit for delivering dry carrier gas to the sample vial, and an outlet syringe, connected to an outflow conduit for carrying vaporized water and carrier gas from the sample vial to a titration instrument,
    wherein the syringe unit is solidly connected to the carriage unit and arranged so that the continued downward movement of the carriage unit, after the lift platform has come to rest on a floor of the oven floor, causes the inlet syringe and the outlet syringe to puncture a lid of the sample vial, thereby connecting the sample vial to the respective delivery and the outflow conduits.

3. The mechanism of claim 2, where the inlet syringe and the outlet syringe are arranged concentrically, with the outlet syringe surrounding the inlet syringe.

4. The mechanism of claim 2, wherein the syringe unit comprises a sealing element that forms a tight seal around the entry puncture of the inlet syringe and the outlet syringe when the carriage unit is at a lowest point of a downward/upward movement cycle.

5. The mechanism of claim 1, wherein the vial lift unit further comprises a vial separator element, solidly connected to the second vertical guide rail element, to pull the sample vial off of the syringe unit after the sample vial has been lifted off the lift platform by an upward movement of the carriage unit, thereby allowing the sample vial to drop back onto the lift platform.

6. The mechanism of claim 1, wherein the mechanism further comprises a drive unit that actuates the vertical downward and upward movements of the carriage unit, in response to command signals received from a controller.

7. The mechanism of claim 6, wherein the drive unit comprises a stepper motor and a spindle drive mechanism.

8. The mechanism of claim 6, wherein:
    the carriage unit has a two-part configuration, wherein:
    the first part is a slider block, such that the drive unit actuates sliding movement thereof along the first vertical guide rail; and
    the second part is a carriage stage that holds the vial lift unit and the syringe unit and is slidable along the first vertical guide rail within a narrow range of vertical movement relative to the slider block,
    wherein a light gate with a light barrier vane and an emitter/sensor unit is arranged between the slider block and the carriage stage;
    wherein a biasing spring urges the slider block and the carriage stage apart to hold the light gate open, and
    wherein, when the carriage stage arrives at an end of its downward movement phase and the slider block continues to be driven against the carriage stage by the drive unit against the force of the biasing spring, the light gate is closed, causing a signal to be sent to the controller to indicate the completion of the downward movement of the carriage unit.

9. The mechanism of claim 3, wherein the syringe unit comprises a sealing element that forms a tight seal around the entry puncture of the inlet syringe and the outlet syringe when the carriage unit is at a lowest point of a downward/upward movement cycle.

10. The mechanism of claim 5, wherein the mechanism further comprises a drive unit that actuates the vertical downward and upward movements of the carriage unit, in response to command signals received from a controller.

11. The mechanism of claim 3, wherein the mechanism further comprises a drive unit that actuates the vertical downward and upward movements of the carriage unit, in response to command signals received from a controller.

12. The mechanism of claim 3, wherein the vial lift unit further comprises a vial separator element, solidly connected to the second vertical guide rail element, to pull the sample vial off of the syringe unit after the sample vial has been lifted off the lift platform by an upward movement of the carriage unit, thereby allowing the sample vial to drop back onto the lift platform.

13. The mechanism of claim 9, wherein the vial lift unit further comprises a vial separator element, solidly connected to the second vertical guide rail element, to pull the sample vial off of the syringe unit after the sample vial has been lifted off the lift platform by an upward movement of the carriage unit, thereby allowing the sample vial to drop back onto the lift platform.

14. The mechanism of claim 13, wherein the mechanism further comprises a drive unit that actuates the vertical downward and upward movements of the carriage unit, in response to command signals received from a controller.

15. The mechanism of claim 14, wherein the drive unit comprises a stepper motor and a spindle drive mechanism.

16. The mechanism of claim 14, wherein:
the carriage unit has a two-part configuration, wherein:
the first part is a slider block, such that the drive unit actuates sliding movement thereof along the first vertical guide rail; and
the second part is a carriage stage that holds the vial lift unit and the syringe unit and is slidable along the first vertical guide rail within a narrow range of vertical movement relative to the slider block,
wherein a light gate with a light barrier vane and an emitter/sensor unit is arranged between the slider block and the carriage stage;
wherein a biasing spring urges the slider block and the carriage stage apart to hold the light gate open, and
wherein, when the carriage stage arrives at an end of its downward movement phase and the slider block continues to be driven against the carriage stage by the drive unit against the force of the biasing spring, the light gate is closed, causing a signal to be sent to the controller to indicate the completion of the downward movement of the carriage unit.

\* \* \* \* \*

UNITED STATES PATENT AND TRADEMARK OFFICE
CERTIFICATE OF CORRECTION

PATENT NO. : 10,877,058 B2  
APPLICATION NO. : 16/059899  
DATED : December 29, 2020  
INVENTOR(S) : Forrer Page 1 of 1

It is certified that error appears in the above-identified patent and that said Letters Patent is hereby corrected as shown below:

On the Title Page

Item (30), Foreign Application Priority Data, please delete "Aug. 10, 2017 (EP) ............... 17185694" and insert -- "Aug. 10, 2017 (EP) ............... 17185694.1" --.

Item (56), References Cited, Other Publications, please delete "Metrohm AG, 874 Oven Sample Processor Manual, retrieved Jan. 15, 2018 at https://www.rnetrohm.com/en-us/products-overview/karl-fischer-titration/k- f-sample-preparation/%7B17C1BE6F-C233-4185-A861-A7F283081306%7D, Jun. 2011, 79 pages, Switzerland." and insert -- METROHM AG, 874 Oven Sample Processor Manual, retrieved January 15, 2018 at https://www.metrohm.com/en-us/products-overview/karl-fischer-titration/kf-sample-preparation/%7B17C1BE6F-C233-4185-A861-A7F283081306%7D, 06/2011, 79 pages, Switzerland. --.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*